United States Patent
Furusawa et al.

(10) Patent No.: US 9,118,838 B2
(45) Date of Patent: Aug. 25, 2015

(54) EXPOSURE CONTROLLER FOR ON-VEHICLE CAMERA

(71) Applicant: CLARION CO., LTD., Saitama (JP)

(72) Inventors: Isao Furusawa, Saitama (JP); Teruki Takahashi, Saitama (JP)

(73) Assignee: Clarion Co., Ltd., Saitama (JP)

( * ) Notice: Subject to any disclaimer, the term of this patent is extended or adjusted under 35 U.S.C. 154(b) by 390 days.

(21) Appl. No.: 13/753,355

(22) Filed: Jan. 29, 2013

(65) Prior Publication Data
US 2013/0194424 A1    Aug. 1, 2013

(30) Foreign Application Priority Data
Jan. 30, 2012    (JP) .................................. 2012-016279

(51) Int. Cl.
*H04N 7/18*    (2006.01)
*H04N 5/235*    (2006.01)

(52) U.S. Cl.
CPC ............. *H04N 5/2353* (2013.01); *H04N 5/235* (2013.01); *H04N 7/181* (2013.01)

(58) Field of Classification Search
CPC ... H04N 5/2353; H04N 5/235; H04N 5/2351; H04N 7/181

USPC ......................................................... 348/148
See application file for complete search history.

(56) References Cited

U.S. PATENT DOCUMENTS

| 7,564,487 B2 * | 7/2009 | Kato et al. ................... 348/231.2 |
| 7,609,908 B2 * | 10/2009 | Luo et al. ...................... 382/274 |
| 2006/0215908 A1 * | 9/2006 | Kamon et al. ................. 382/167 |

FOREIGN PATENT DOCUMENTS

JP    2006-060504 A    3/2006

* cited by examiner

*Primary Examiner* — Michael Lee
(74) *Attorney, Agent, or Firm* — Studebaker & Brackett PC (57) ABSTRACT

An exposure controller for an on-vehicle camera mounted on a vehicle is capable of performing exposure control such that a predetermined subject such as a lane marker can be imaged with a constant contrast regardless of variation of peripheral brightness and directions of the variation. An exposure controller images information imaged by an imaging part based on a second exposure property having linearity, the second exposure property being obtained by converting a first exposure property having non-linearity, calculates a target density value with which pixels in a window set in the image are to be imaged based on brightness values corresponding to density values of the pixels in the window, sets a third exposure property for obtaining the calculated target density value, and performs imaging with the set third exposure property.

12 Claims, 8 Drawing Sheets

EXPOSURE CONTROLLER FOR ON-VEHICLE CAMERA

CROSS REFERENCE TO RELATED APPLICATION

The present application claims priority to Japanese Patent Application No. 2012-016279 filed Jan. 30, 2012 to the Japan Patent Office, the entire content of which is incorporated herein by reference in its entirety.

BACKGROUND OF THE INVENTION

1. Field of the Invention

The present invention relates to an exposure controller for an on-vehicle camera mounted on a vehicle, which is capable of controlling an exposure of the on-vehicle camera such that the on-vehicle camera is capable of photographing a subject with a constant contrast regardless of variation of peripheral brightness.

2. Description of the Related Art

Recently, a lane deviation alarm system has been proposed, which has a camera mounted on a vehicle, and which detects a white line or a yellow line (hereinafter, referred to as a lane marker) from an image obtained by imaging a lane marker drawn on edges of a driving lane by the mounted camera by using image processing, and judges a possibility of a lane deviation based on a position of the lane marker and behavior of the vehicle to output an alarm.

In the system using such an image processing, it is preferable that the lane marker can be steadily detected regardless of peripheral brightness.

Therefore, an exposure controller has been proposed, which performs exposure control of a camera according to peripheral brightness (see Japanese Patent Application Publication No. 2006-60504).

The technology disclosed in Japanese Patent Application Publication No. 2006-60504 includes calculating an average pixel value of a road surface area, multiplying the calculated average pixel value by a constant according to the average pixel value to correct the average pixel value, performing an exposure control such that the corrected average pixel value is equal to a target pixel value to image an image, and detecting a lane marker from the image imaged as described above.

However, in the exposure control method described in Japanese Patent Application Publication No. 2006-60504, it is not considered that an exposure property of an image pickup device used in an imaging part has non-linearity. Therefore, in the image on which the exposure control has been performed, contrast between the road surface and the lane marker is not constant.

Here, when detecting the lane marker from the image on which the exposure control has been performed, it is necessary to set an appropriate threshold value for distinguishing the lane marker from the road surface in each imaged image. However, in case where the contrast is not constant as described above, it is necessary to change the threshold value in every image so as to appropriately distinguish the lane marker and the road surface. Accordingly, there is a problem in that process for setting threshold values is complicated and calculation time is increased.

Furthermore, Japanese Patent Application Publication No. 2006-60504 discloses an exposure control method when peripheral brightness is drastically increased but not an exposure control method when peripheral brightness is drastically decreased, that is, it gets drastically dark. Therefore, it is not obvious whether or not the technology disclosed in Japanese Patent Application Publication No. 2006-60504 can apply to the case where it gets drastically dark, such as the vehicle enters a tunnel.

SUMMARY OF THE INVENTION

An embodiment of the present invention is to provide an exposure controller for an on-vehicle camera, which is capable of performing exposure control such that a predetermined subject such as a lane marker can be imaged with a constant contrast regardless of variation of peripheral brightness and directions of the variation.

An exposure controller for an on-vehicle camera according to an embodiment of the present invention images information imaged by an imaging part based on a second exposure property having linearity, the second exposure property being obtained by converting a first exposure property having non-linearity; sets a window at a predetermined position in the image; calculates a target density value with which pixels in the window are to be imaged based on brightness values corresponding to density values of the pixels in the window; sets a third exposure property for obtaining the calculated target density value; and performs imaging with the set third exposure property. Thereby, according to the exposure controller, an image with a constant contrast between a road surface and a predetermined subject such as a lane marker can be imaged even when peripheral brightness changes.

MODE FOR CARRYING OUT THE INVENTION

Hereinafter, embodiments of an exposure controller for an on-vehicle camera according to the present invention will be explained with reference to drawings.

(Embodiment 1)

This embodiment relates to a lane marker detection device as an example of an exposure controller for an on-vehicle camera according to the present invention.

Figure 1:
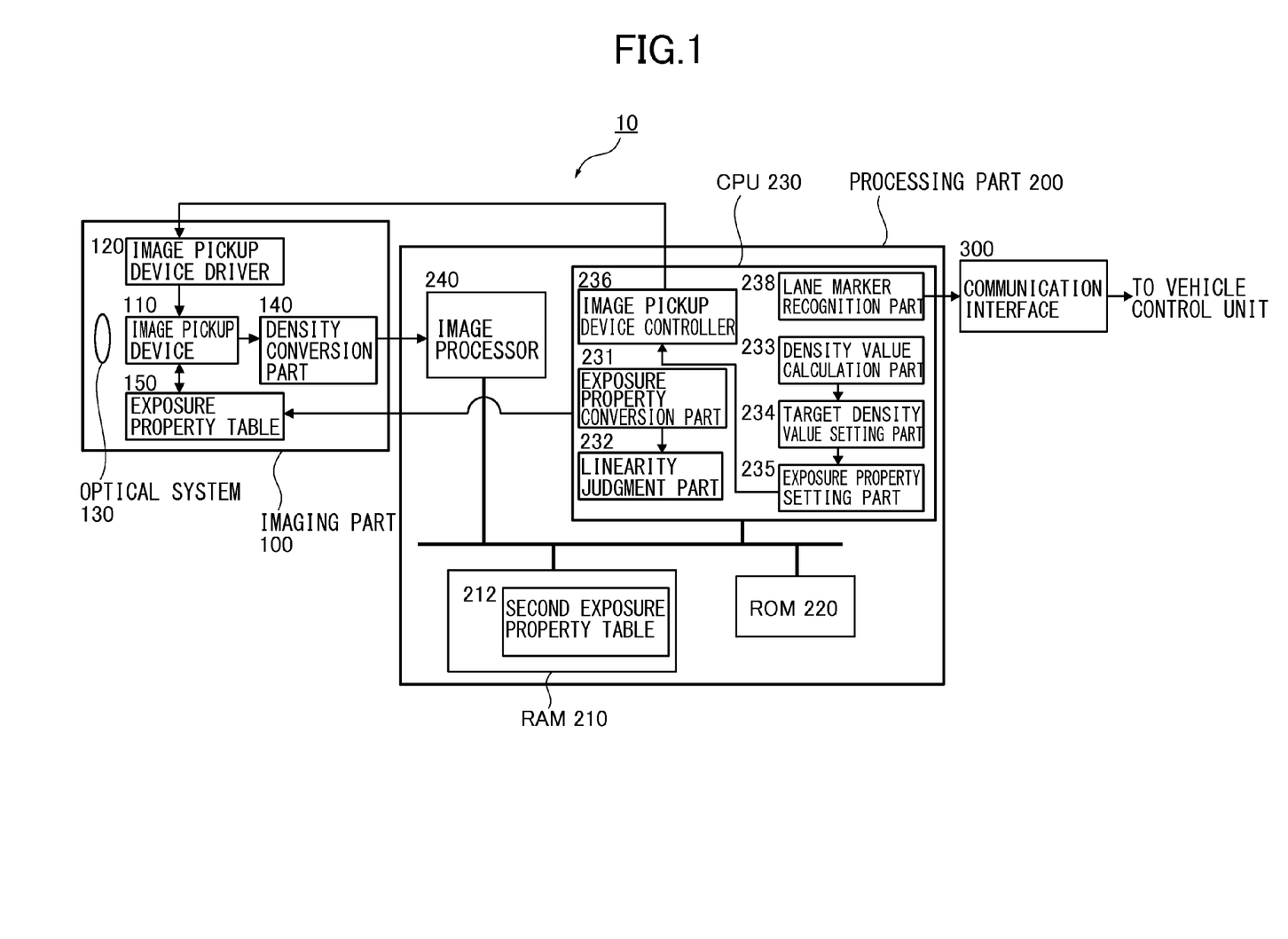
FIG. 1 is a block diagram showing a schematic configuration of an exposure controller for an on-vehicle camera according to Embodiment 1 of the present invention.

FIG. 1 is a block diagram showing a configuration of the lane marker detection device 10 according to Embodiment 1 of the present invention.

Figure 2:
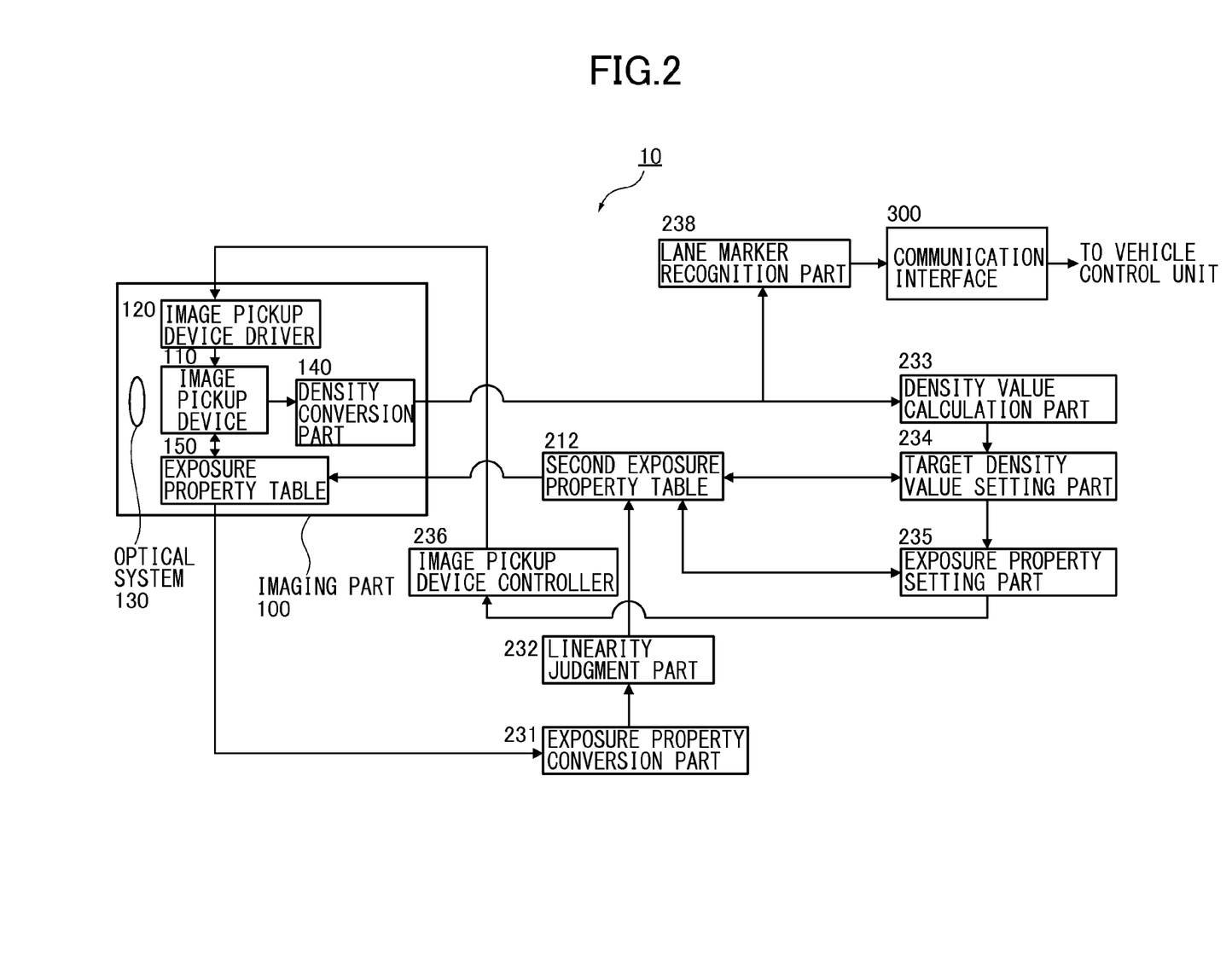
FIG. 2 is a function block diagram explaining connections between function blocks of FIG. 1.

FIG. 2 is a function block diagram more clearly showing connections between function blocks shown in FIG. 1.

The lane marker detection device 10 according to this embodiment is mounted on a non-illustrated vehicle, and includes an imaging part 100 which images an area including a road surface ahead of the vehicle and is capable of changing shutter speed, a processing part 200 which processes an image imaged by the imaging part 100 to perform setting of an appropriate exposure property and a recognition of a lane marker, and a communication interface 300 which transmits information on a position and curvature of the lane marker detected by the processing part 200 to a vehicle control unit.

The imaging part is mounted on a ceiling part at a center of the vehicle or in a vicinity of a room mirror with a layout where the imaging part 100 is capable of imaging the area including the road surface ahead of the vehicle in a forwarding direction.

More specifically, the imaging part 100 includes an image pickup device 110 including CCD elements or C-MOS elements which convert incident light into electric charges, an image pickup device driver 120 which drives the image pickup device 110, an optical system 130 including optical lenses mounted in a direction perpendicular to a surface of the image pickup device 110, an exposure property table 150 where a later-described first exposure property table or a later-described second exposure property table, which is a conversion table for converting brightness information at a point imaged by the image pickup device 110 into density information is stored, and a density conversion part 140 which converts the brightness information at the point imaged by the image pickup device 110 into the density information based on the exposure property table 150. Moreover, the density conversion part 140 has an AD conversion function and outputs an image having density information in a digital form on each pixel.

The processing part 200 includes, more specifically, a RAM 210 which performs storing images imaged by the imaging part 100 or images in the middle of processing in the processing part 200 and storing necessary data for performing image processing, a ROM 220 which performs storing necessary program and data for performing image processing, a CPU 230 which performs generation processing of the later described second exposure property table, selection processing of a third exposure property, and the like, and an image processor 240 which performs forwarding of the image generated in the density conversion part 140 to the RAM 210, and performs edge detection and binarization which are preprocessings for a later-described lane marker recognition part 238 to recognize a lane marker.

The RAM 210, the ROM 220, the CPU 230, and the image processor 240 in the processing part 200 are connected by internal busses.

The RAM 210 temporarily stores the imaged image and also data in the middle of processings which are performed in the CPU 230. Furthermore, the RAM 210 stores the second exposure property table 212 generated by a later described processing.

In the ROM 220, necessary programs to operate the lane marker detection device 10 are preliminarily stored.

The CPU 230 includes, more specifically, an exposure property conversion part 231 which converts an exposure property (a first exposure property) which is stored in the exposure property table 150 and which the image pickup device 110 has in itself into a second exposure property having linearity in a predetermined density value range, a linearity judgment part 232 which judges linearity of the converted second exposure property, a density value calculation part 233 which calculates a density value in a window set with a predetermined size and position in the image which is obtained by conversion by the density conversion part 140, a target density value setting part 234 which calculates a target density value with which pixels in the window are to be imaged, an exposure property setting part 235 which sets the third exposure property with which the pixels in the window are to be imaged with the target density value and which has the same exposure property as the second exposure property in a density value range where the second exposure property has linearity, based on the exposure property stored in the second exposure property table 212, an image pickup device controller 236 which sets a shutter speed with respect to the image pickup device driver 120 so as to achieve the third exposure property, and a lane marker recognition part 238 which detects a position of the lane marker from the imaged image.

Here, the third exposure property which has the same exposure property as the second exposure property may, for example, have the same tendency in the relationship between the brightness values and the density values and be shifted in parallel to each other with difference in the density value.

Next, operation of the lane marker detection device 10 according to this embodiment will be explained based on a flowchart of FIG. 5.

Figure 5:
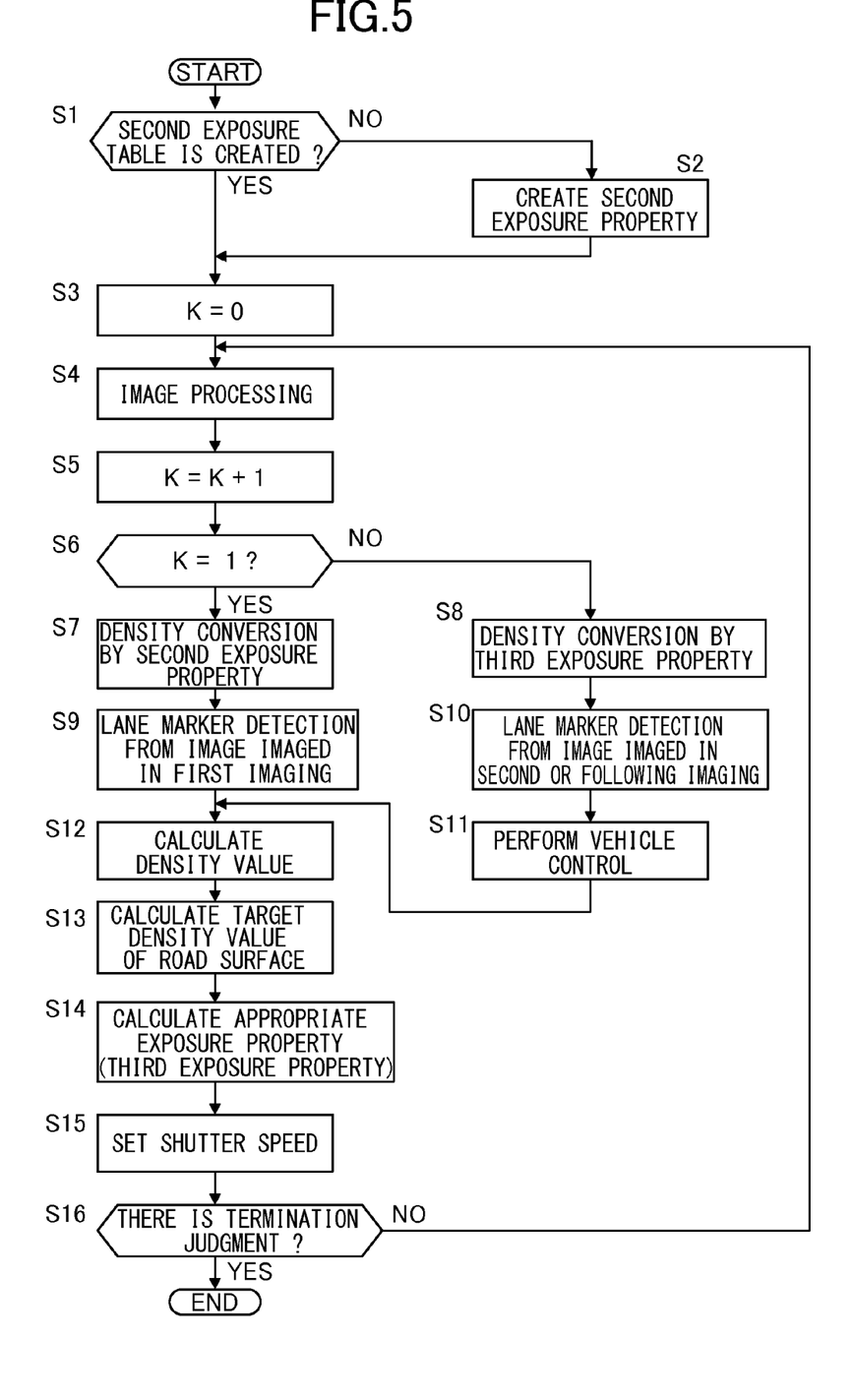
FIG. 5 is a flowchart showing a flow of operations of Embodiment 1 of the present invention.

First, in the exposure property conversion part 231, it is judged whether or not a second exposure property is already generated in the second exposure property table 212 (step S1 of FIG. 5).

This processing is performed by previously confirming whether or not there is a flag stored together with the second exposure property table 212 when the second exposure property table 212 is produced.

If the second exposure property is already generated, the process moves to step S3.

On the other hand, if the second exposure property is not generated, the second exposure property is generated in the exposure property conversion part 231 (step S2 of FIG. 5).

A method for generating the second exposure property will be explained below.

A subject having a brightness value L is imaged by the image pickup device 110 via the optical system 130, and a density value p of a pixel is obtained as an output of the density conversion part 140 which follows the image pickup device 110. In this case, a relationship between the brightness values L and the density values p is referred to as an exposure property of the imaging part 100, and particularly, an exposure property which the image pickup device 110 has in itself is referred to as a first exposure property. This exposure property is previously stored in the exposure property table 150, and every time the image pickup device 110 performs imaging, content of the exposure property table 150 is referred to and the brightness value L is converted into the density value p in the density conversion part 140.

Figure 3:
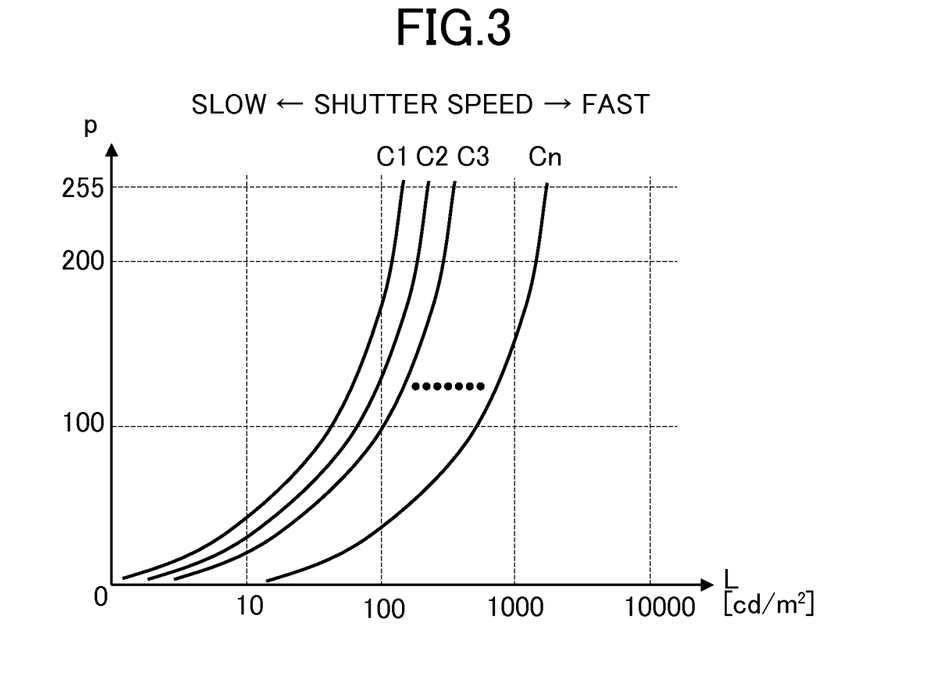
FIG. 3 is a view explaining first exposure properties of an imaging part.

Examples of the first exposure property of the imaging part 100 are shown in FIG. 3. As shown in FIG. 3, the first exposure property is generally non-linear. The first exposure property varies according to the shutter speed and gain of the imaging part 100 and therefore the first exposure properties are expressed with plural different curves.

FIG. 3 shows, as an example, the first exposure property for each shutter speed of the imaging part 100.

In the imaging part 100 having such first exposure properties, when imaging an area including a road surface ahead of the vehicle, since the first exposure property is non-linear, contrast (ratio of density values) between a density value of pixels corresponding to the road surface and a density value of pixels corresponding to the lane marker drawn on the road surface is not constant and varies according to peripheral brightness.

Therefore, in order for the contrast between the road surface and the lane marker to be maintained constant regardless of peripheral brightness, in the exposure property conversion part 231, the first exposure property stored in the exposure property table 150 is converted into the second exposure property having linearity in a relationship between a brightness value (horizontal axis) and a density value (vertical axis).

In the exposure property table 150, a plurality of first exposure properties of the imaging part 100, which are shown in FIG. 3 are previously measured and stored.

The measurements of the first exposure properties are performed by imaging a subject having a plurality of predetermined brightness values in each of a plurality of shutter speeds while changing the shutter speed by the image pickup device controller 236.

The density values p of pixels corresponding to the imaged subject are measured to measure a plurality of first exposure properties (C1, C2, ..., Cn) corresponding to a plurality of shutter speeds. Here, C1, C2, ..., Cn have the same shape and are plotted to be shifted along the horizontal axis of FIG. 3 in a parallel manner.

The first exposure property is, in general, referred to as a Gamma property, and has a relationship of an exponential function expressed by (Equation 1).

$$p = L^\gamma \quad \text{(Equation 1)}$$

In the exposure property conversion part 231, the plurality of first exposure properties are corrected and converted into a plurality of second exposure properties having linearity over a predetermined density value range.

The density value of a pixel is a value from 0 to 255, and if a density value of a pixel having a density value p is corrected to be a density value p' by a second exposure property, the density value p' is expressed by (Equation 2).

$$p' = 255 \times (p/255)^{(1/\gamma)} \quad \text{(Equation 2)}$$

Here, in a case where the variable $\gamma$ in (Equation 1) is not known, a second exposure property Di is calculated while changing the variable $\gamma$ by a predetermined value with respect to arbitrary one Ci of the plurality of first exposure properties (C1, C2, ..., Cn).

Every time the second exposure property Di is calculated, in the linearity judgment part 232, the linearity of the second exposure property Di is judged, and if the deviation from linear line is within a predetermined range over the predetermined density value range, it is judged the second exposure property Di having linearity is obtained.

In the judgment of linearity, by determining summation of deviations between the second exposure property Di and the linear line fitted to the second exposure property Di and a density value range for the summation, if the summation of the deviations is less than the determined value in the density value range, it can be judged that the second exposure property Di has linearity in the density value range.

The same judgments are repeatedly performed while changing the variable $\gamma$ in (Equation 2) little by little, and the second exposure property Di having linearity over the most wide density value range is determined.

By shifting in parallel the second exposure property Di obtained as described above in a horizontal axis direction of FIG. 3 by a predetermined amount corresponding to difference of the shutter speeds, a plurality of second exposure properties (D1, D2, ..., Di, ..., Dn) are obtained.

The obtained second exposure properties are stored in the second exposure property table 212 in the RAM 210. At this time, the density value range where it is judged that there is linearity is also stored. The obtained second exposure properties are overwritten on the exposure property table 150.

On the other hand, in case where the variable $\gamma$ in (Equation 1) is known, by using the variable $\gamma$, arbitrary one Ci of the plurality of first exposure properties C1, C2, ..., Ci, ..., Cn is corrected by (Equation 2) to determine a second exposure property Di.

Then, if the deviation from the linear line is in a predetermined range over a certain density value range, it is judged that a second exposure property having linearity is obtained.

By shifting the second exposure property Di obtained as described above in parallel in the horizontal axis direction of FIG. 3 by a predetermined amount corresponding to the difference between the shutter speeds, a plurality of second exposure properties (D1, D2, ..., Dn) are obtained.

The obtained second exposure properties are stored in the second exposure property table 212 in the RAM 210. At this time, the density value range where it is judged that there is linearity is also stored. The obtained second exposure properties are overwritten on the exposure property table 150.

Figure 4:
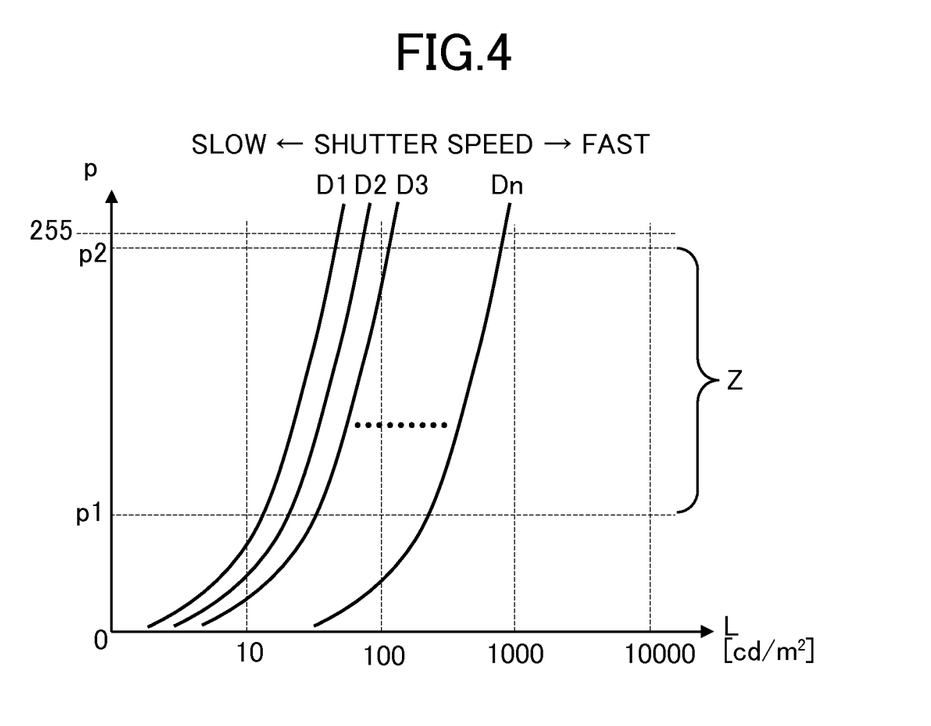
FIG. 4 is a view explaining second exposure properties of the imaging part.

Here, for the sake of explanation, as shown in FIG. 4, it is assumed that the plurality of second exposure properties (D1, D2, ..., Dn) are obtained and it is judged that the second exposure properties have linearity over the density value range from a density value p1 to a density value p2.

Next, in the image pickup device controller 236, "0" is stored as a constant K indicating a number of imaging (step S3 of FIG. 5).

Then, an image is imaged by the imaging part 100 (step S4 of FIG. 5). The imaging at this time is performed with a shutter speed set at a predetermined initial value by the image pickup device controller 236.

Next, in the image pickup device controller 236, the constant K indicating the number of imaging is incremented (step D5 of FIG. 5).

In step S6, it is judged whether or not the value of the constant K is "1", that is, whether or not the imaging is the first imaging.

When K=1, that is, when the imaging is the first imaging, in the density conversion part 140, the brightness value of the subject imaged in step S4 is converted into a density value based on the second exposure property Di corresponding to the shutter speed at the initial value, which is stored in the second exposure property table 212 (step S7 of FIG. 5). The image generated as described above is stored in the RAM 210. Then, the process moves to step S9.

The image stored in the RAM 210 is appropriately read out from the RAM 210 and predetermined image processings are performed on the image in the following processings. Data or the image in the middle of image processings is also appropriately temporarily stored in the RAM 210.

On the other hand, when K≠1, that is, when the imaging is the second or following imaging, in the density conversion part 140, the brightness value of the subject imaged in step S4 is converted into a density value based on a third exposure property set in the later described exposure property setting part 235 (step S8 of FIG. 5). The image generated as described above is stored in the RAM 210. Then, the process moves to step S10. Processing in step S8 will be explained in detail later.

Next, in the lane marker recognition part 238, the image generated in the density conversion part 140 is read out from the RAM 210 and a position of the lane marker is detected (steps S9 and S10 of FIG. 5).

For the detection processing of the lane marker, various methods have been proposed and any method of those can be applied. However, different processing methods are applied for the image obtained in the first imaging (K=1) from one for the image obtained in the second or following imaging (K>1).

For the image obtained in the first imaging, the imaged image is binarized with a predetermined threshold value and an area having a shape similar to a shape of the lane marker is extracted from the binarized image. By performing a linear line fitting or a curve fitting on the extracted area, the lane marker is detected (step S9 of FIG. 5) and then the process moves to step S12.

On the other hand, for the image obtained in the second or following imaging, the imaged image is binarized with, as a threshold value, a density value higher by a predetermined value than the later described target density value of the road surface. An area having a shape similar to a shape of the lane marker is extracted from the binarized image as described above. By performing a linear line fitting or a curve fitting on the extracted area as described above, the lane marker is detected (step S10 of FIG. 5), and then the process moves to step S11.

As described above, for the image obtained in the second or following imaging, as described later, the shutter speed to achieve an appropriate exposure set in the exposure property setting part 235 is set in the image pickup device controller 236, and therefore in the imaged image, the lane marker is imaged with a constant contrast from the road surface with respect to the road surface imaged with the target density value.

Accordingly, by binarizing the image with the higher density value by the predetermined value than the later-described target density value of the road surface, the lane marker can be constantly and steadily detected.

In step S11, a distance in a lateral direction from the vehicle to the lane marker, a curvature of the lane marker ahead of the vehicle, and the like are calculated. The values calculated as described above are transmitted to the non-illustrated vehicle control unit via the communication interface 300 such as I²C, and the like to perform predetermined vehicle controls.

As the vehicle controls, for example, there are a control to perform an attention alert for calling for driver's attention by outputting an alert when there is possibility for the vehicle to run over the lane marker, and a control to perform an attention alert for calling driver's attention by generating in a steering actuator a reaction force which is in an opposite direction to the direction where the vehicle runs over the lane marker.

When it is judged that the imaging is the first imaging (K=1), after detecting the lane marker in step S9, the process moves to step S12 without performing vehicle controls. This is because an appropriate exposure control is not performed on the image obtained in the first imaging.

Next, in the density value calculation part 233, a window W1 with predetermined size and shape is set at a position where the road surface is imaged in the image imaged in step S4 and generated in steps S7 and S8. An average value of density values of pixels in the window is calculated (step S12 of FIG. 5).

Figure 9:
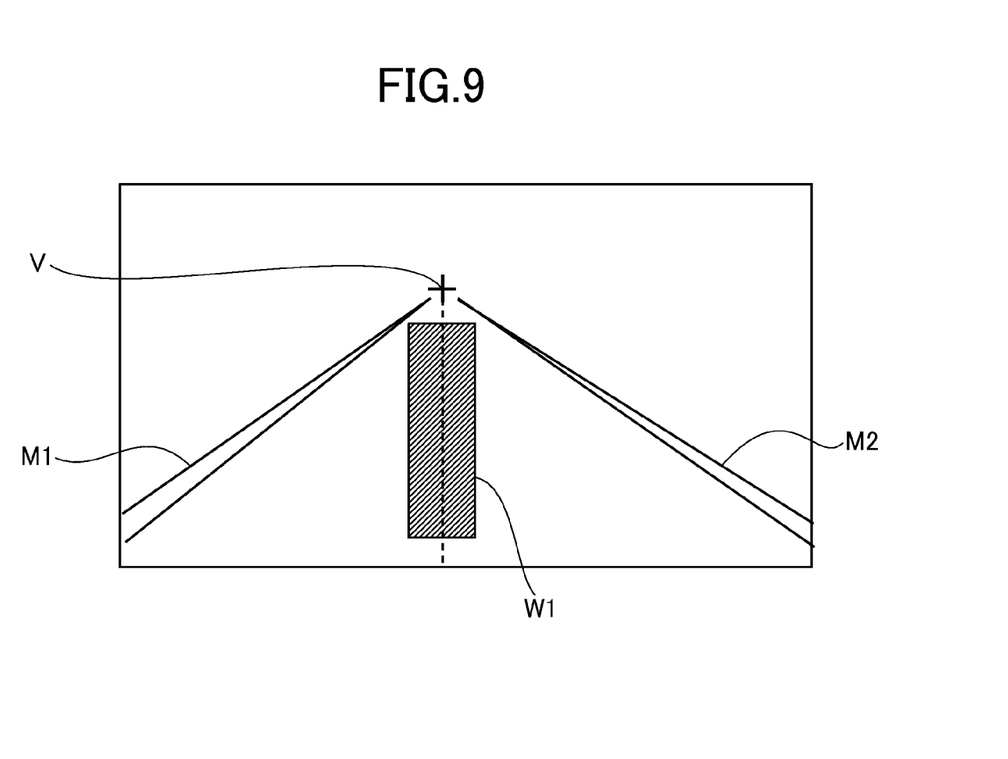
FIG. 9 is a view explaining a method for setting a window.

The window W1 is, for example, as shown in FIG. 9, set at a lower part of a disappearing point V which is determined based on detection results of a left lane marker M1 and a right lane marker M2.

The size and shape of the window W1 may be set by determining appropriate size and shape based on previously performed experiment or the like.

The window W1 may be set, if the window can be applied to the road area, at a lower area of a center part in the horizontal direction of the image, that is, a position immediately close to and ahead of the vehicle.

Next, an average value of brightness values of the pixels in the window W1 is calculated based on the average value of the density values of the pixels in the set window W1 and one of the second exposure properties, which is used when imaging the image.

A method for calculating the brightness value will be explained with reference to FIG. 6.

In step S12, it is assumed that the average value p3 of the density values of the pixels in the window W1 is calculated. Further, it is assumed that in the imaged image, the brightness value L is converted into the density value p based on the second exposure property D3 which is one of the plurality of second exposure properties (D1, D2, D3, ..., Dn).

Figure 6:
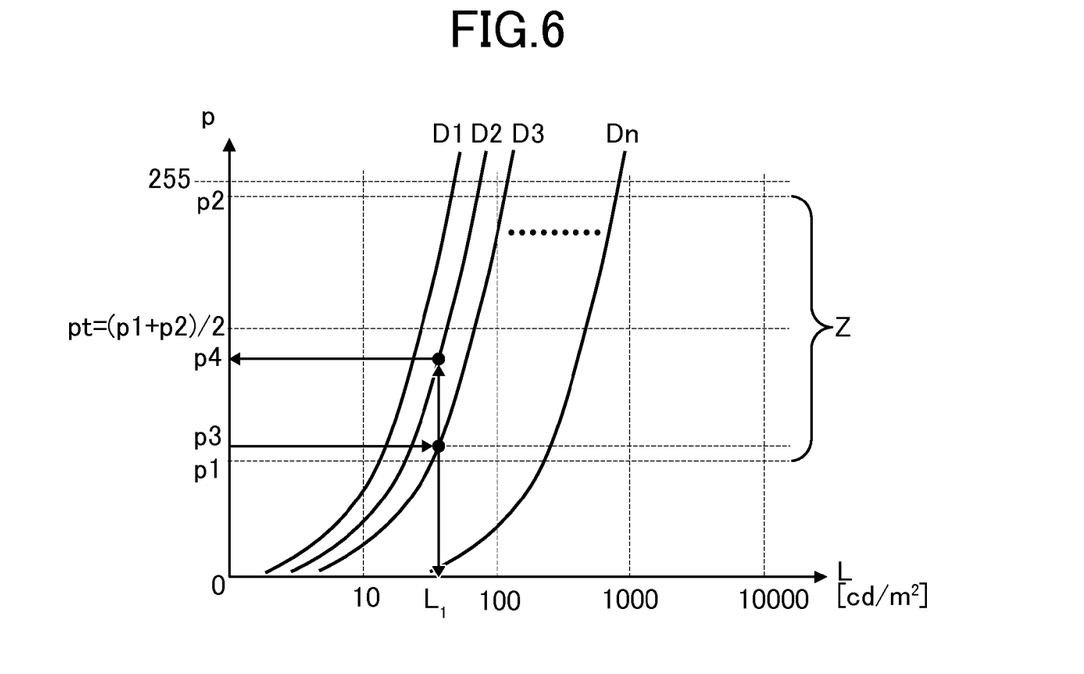
FIG. 6 is a view explaining a method for calculating a target density value.

At this time, it is found in FIG. 6 that the average value of the brightness values of the pixels in the window W1 is L1.

In the target density value setting part 234, a target density value pt is calculated based on the average value of the density values p of the pixels in the window W1 such that the lane marker is imaged with a predetermined contrast with the road surface (step S13 of FIG. 5).

Hereinafter, a method for calculating the target density value pt will be explained.

In order to easily detect the lane marker, it is preferable that contrast between the road surface and the lane marker is constant regardless of peripheral brightness. Therefore, the road surface and the lane marker are to be imaged in a density value range Z where the second exposure property has linearity.

Therefore, as shown in FIG. 6, the target density value pt of the road surface is set to a middle position in the density value range Z (from the density value p1 to p2) where the second exposure property has linearity, that is, pt=(p1+p2)/2.

The brightness of the road surface is influenced by and changes according to peripheral brightness and together with this, the brightness of the lane marker changes. Therefore, as described above, the target density value pt of the road surface is set to the middle position of the density value range Z. Thereby, even though the brightness of the road surface changes, the road surface and the lane marker are imaged in the density value range Z.

Next, in the exposure property setting part 235, an exposure property which is appropriate for the road surface to be imaged with the target density value pt is selected from the plurality of second exposure properties (D1, D2, ..., Dn) to be set step S14 of FIG. 5).

This processing will be explained with reference to FIG. 6.

As described above, it is found in FIG. 6 that the average value of the brightness values of the pixels in the window W1 is L1.

Furthermore, it is found from FIG. 6 that, in order for the road surface with the average value L1 of the brightness values to be imaged with the target density value pt, the second exposure property D3 is to be changed to the second exposure property D2.

That is, it is found that, by changing the second exposure property D3 to the second exposure property D2, the average value of the density values of the pixels in the window W1 is the density value p4 which is the closest to the target density value pt to be used to perform imaging.

Here, the target density value pt and the density value p4 which is actually imaged do not coincide with each other. This is because the plurality of second exposure properties (D1, D2, ..., Dn) are roughly described for the sake of explanation. In practice, the plurality of second exposure properties (D1, D2, ..., Dn) are more finely set and therefore the exposure property can be set with smaller difference between the target density value pt and the density value p4.

In order to reduce difference between the target density value pt and the density p4, in the density value range Z where the second exposure property has linearity, it is preferable that as many as possible, at least two or more second exposure properties at different shutter speeds are set.

In step S14, one selected second exposure property (D2) is referred to as a third exposure property.

Next, instructions for setting a shutter speed to achieve the third exposure property and for performing imaging are output from the exposure property setting part 235 to the image pickup device controller 236 (step S15 of FIG. 5).

The instructed shutter speed is set and an instruction for performing imaging is output from the image pickup device controller 236 to the image pickup device driver 120.

Next, if it is judged in the lane marker recognition part 238 that an engine of the vehicle stops or a main switch for performing the lane marker recognition turns off, the processing is terminated (when "Yes" in step S16 of FIG. 5).

On the other hand, in step S16, if the termination of the processing for the lane marker detection is not judged, the process moves to step S4. Then imaging is performed in the imaging part 100 with the shutter speed to achieve the third exposure property set by the image pickup device controller 236.

Then, if the imaging is the second or following imaging (K>1), in the density conversion part 140, the brightness value of the imaged subject is converted into a density value based on the third exposure property set in step S14 (step S8 of FIG. 5).

Furthermore, in step S9, the lane marker detection is performed with respect to the image where the road surface is observed with the target density value pt.

At this time, since the road surface is observed with the target density value pt set in step S14, the lane marker is imaged with a constant contrast with respect to the road surface regardless of peripheral brightness.

Accordingly, by binarizing the image imaged with the third exposure property with a threshold value which is a higher value by a predetermined value than the target density value pt of the road surface, the lane marker can be constantly detected.

The lane marker is detected from the image imaged with the third exposure property set in step S14 and with respect to the image, an average value of brightness values in the window is calculated again. Based on the brightness value, a target density value pt of the road surface is set again, the third exposure property is set, and then a next image is imaged based on the third exposure property.

Afterward, the same processings are repeated according to FIG. 5.

According to the lane marker detection device 10 having the exposure controller for the on-vehicle camera according to Embodiment 1 configured as described above, a plurality of first exposure properties are converted into a plurality of second exposure properties so as to have linearity. Each of the plurality of first exposure properties indicates a relationship between brightness values of a subject imaged in the imaging part 100 and density values of the imaged subject. Based on one of the plurality of second exposure properties, the brightness values of the subject imaged by the imaging part 100 are converted into the density values by the density conversion part 140. Density values of pixels in a window set at a predetermined position in the image generated by the density value calculation part 233 are calculated. In the target density value setting part 234, the target density value pt of the pixels in the window W1 is set in a density value range Z where the second exposure properties have linearity based on the brightness values corresponding to the density values of the pixels in the window W1. In the exposure property setting part 235, a third exposure property to obtain the target density value pt is set, and based on the set third exposure property, the image pickup device controller 236 changes the shutter speed of the imaging part 100 so as to achieve the third exposure property to allow the imaging part 100 to perform imaging. Accordingly, an exposure control of the imaging part 100 can be performed such that an image where the contrast between the road surface and the lane marker is maintained constant can be imaged regardless of variation of peripheral brightness and directions of the variation.

Embodiments of the present invention are not limited to the configurations as described above.

That is, in the above embodiment, in step S12, as a density value in the predetermined window W1, an average value of the density values of all of the pixels in the window W1 is applied. However, as a density value in the predetermined window W1, a central value of the density values of all of the pixels in the window W1 may be applied.

In the above embodiment, in step S14, the target density value pt of the road surface is set at the middle position in the density value range Z where the second exposure properties have linearity. However, the target density value pt may be changed according to driving conditions.

Figure 7:
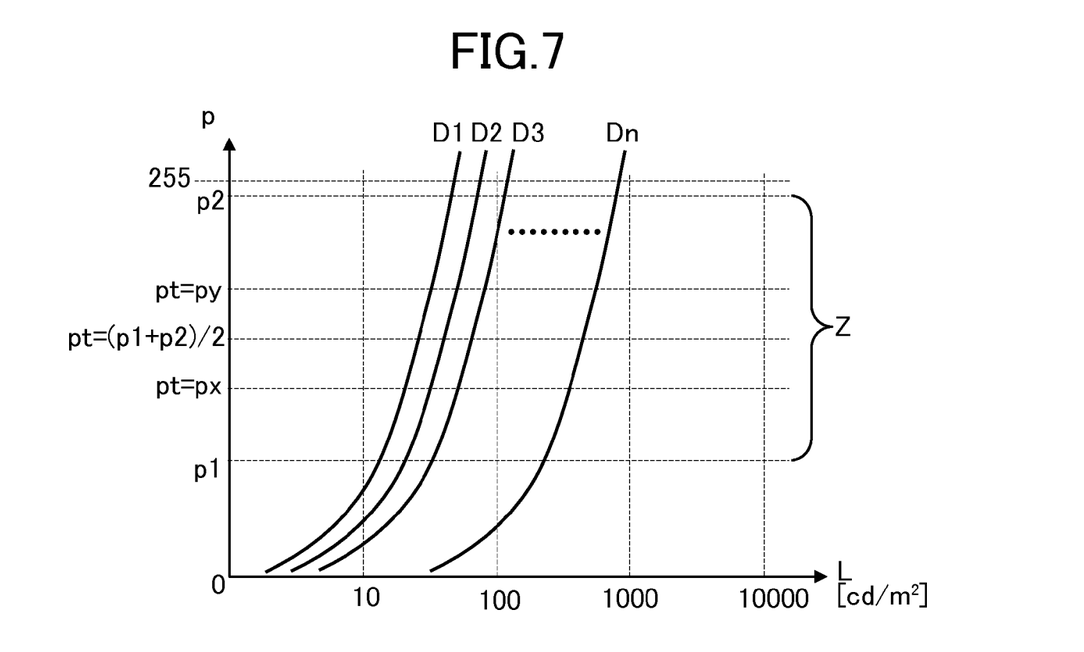
FIG. 7 is a view explaining a second method for calculating a target density value.

For example, before an entrance of a tunnel, as shown in FIG. 7, the target density value pt may be a density value py which is higher than a middle value in the density value range Z within the density value range Z where the second exposure properties have linearity.

When the vehicle enters the tunnel, peripheral brightness drastically goes down and the density values of the road surface are drastically decreased. Therefore, by previously increasing the target density value pt higher than the middle value in the density value range Z, a range of density values at a darker side is set to be broader. Thereby, the road surface and the lane marker are steadily imaged with the density value within the density value range Z even when peripheral brightness drastically goes down.

Thereby, it can be prevented that the density values of the road surface in the imaged image are decreased under the lower limit density of the density value range Z when the vehicle entering the tunnel in case where the target density value pt of the road surface is set at the middle value in the density value range Z. Accordingly, there is an advantageous effect in that the road surface can be immediately imaged with the target density value pt.

Furthermore, before an exit of a tunnel, as shown in FIG. 7, the target density value pt of the road surface may be set to a density value px which is lower than the middle value in the density value range Z where the second exposure properties have linearity within the density value range Z.

In this case, when the vehicle exits from the tunnel, peripheral brightness drastically goes up and the density value of the road surface is drastically increased. Therefore, by previously setting a density value range at a bright side to be broader, the road surface and the lane marker are steadily imaged within the density value range Z even when peripheral brightness drastically goes up.

Thereby, it can be prevented that the density value of the road surface in the imaged image is increased over the upper limit density value of the density value range Z when the vehicle exits from the tunnel in case where the target density value pt of the road surface is set at the middle value in the density value range Z. Accordingly, there is an advantageous effect in that the road surface can be immediately imaged with the target density value pt.

It can be judged whether the vehicle is before an entrance of a tunnel or whether the vehicle is before an exit of a tunnel as follows. By calculating the brightness values of the pixels in the window W1 set by the density value calculation part 233 from each of images imaged at different times, and obtaining a shift of the plurality of brightness values according to time, if the value is gradually going down, it can be judged that the vehicle is before an entrance of a tunnel.

For example, if the brightness values of the pixels in the window are continuously under 100 cd/m², it is judged that the vehicle is running in a tunnel and it is detected that the brightness value shifts from above 100 cd/m² to under 10 cd/m² to set the target density value pt to be a density value py which is higher than a middle value in the density value range Z.

To the contrary, when the brightness values of the pixels in the window are gradually increased, it is judged that the vehicle is before an exit of a tunnel. Then, the target density value pt can be set to a density value px which is lower than the middle value in the range Z of the density values.

Furthermore, as described below, a plurality of windows including lane markers may be set in an area immediately close to the vehicle and in an area far from the vehicle so that shifts of brightness values of the pixels in the plurality of windows according to time are obtained to recognize a positional relationship between the vehicle and the tunnel.

By using a non-illustrated car navigation system, a distance to a tunnel positioned ahead in a forwarding direction may be obtained so that based on the distance value, it can be judged that the vehicle is positioned before an entrance of the tunnel. If the vehicle is already running in the tunnel, a distance to an exit of the tunnel positioned ahead in the forward direction may be obtained so that based on the distance value, it can be judged that the vehicle is positioned before the exit of the tunnel.

Figure 8:
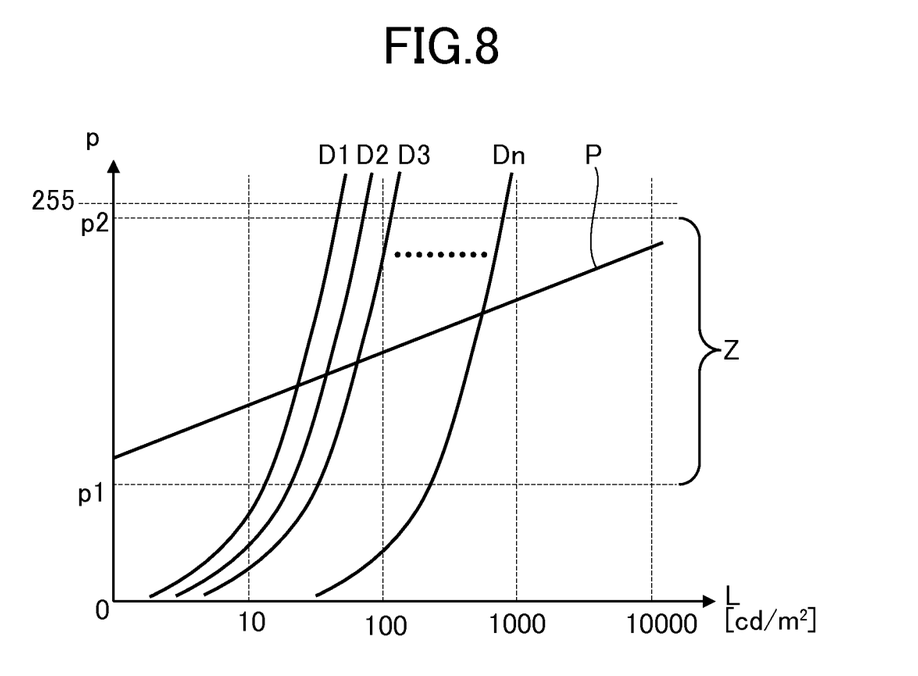
FIG. 8 is a view explaining a third method for calculating a target density value.

The target density value pt of the road surface may be, as shown in FIG. 8, set based on a function P which monotonically increases according to the brightness value L.

Here, the function P is a function where density values are in the density value range Z where the second exposure properties have linearity with respect to the brightness value L.

By setting the target density value pt according to the brightness value of the road surface based on such a function P, even in case where peripheral brightness changes according to time, an amount of change between the target density value pt set with a certain imaging timing and the target density value pt set with the next imaging timing can be reduced. Thereby, exposure control with reduced variation of brightness and darkness can be performed.

Figure 10:
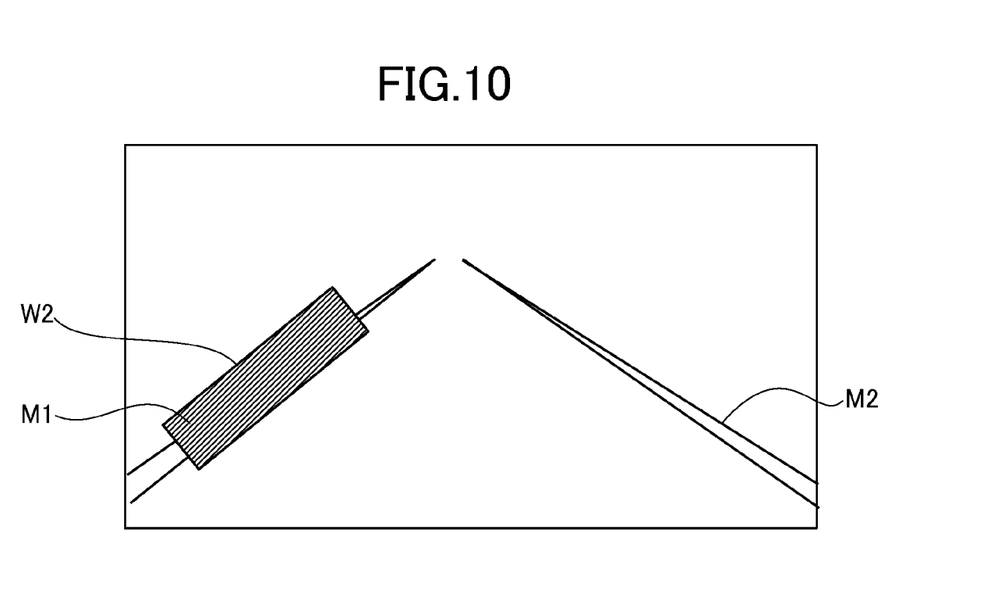
FIG. 10 is a view explaining a second method for setting a window.

Furthermore, in the above embodiment, in step S12, the window W1 is set at an area of the road surface. However, the window may be set at an area including a lane marker. FIG. 10 shows an example where a window W2 is set at an area including a left lane marker M1.

As described above, in case where the window is set at an area including a lane marker, in the density value calculation part 233, density values of the area including the lane marker are calculated.

In the target density value setting part 234, the target density value of the area including the lane marker is set. At this time, the target density value may be set by the same procedures as those when the target density value of the road surface is set.

As described above, by setting the window at the area including the lane marker, the density value of the lane marker part which is a subject to be recognized can be directly controlled. Accordingly, the exposure control can be more directly performed.

When the window is set at the area including the lane marker, it is necessary to appropriately set the threshold value to detect the lane marker.

That is, when the window is set at the area including the lane marker, by binarizing the imaged image with a density value which is lower by a predetermined value than the set target density value, the lane marker can be constantly and steadily detected.

In the above embodiment, one window for calculating brightness values is set. However, it is not limited thereto.

Figure 11:
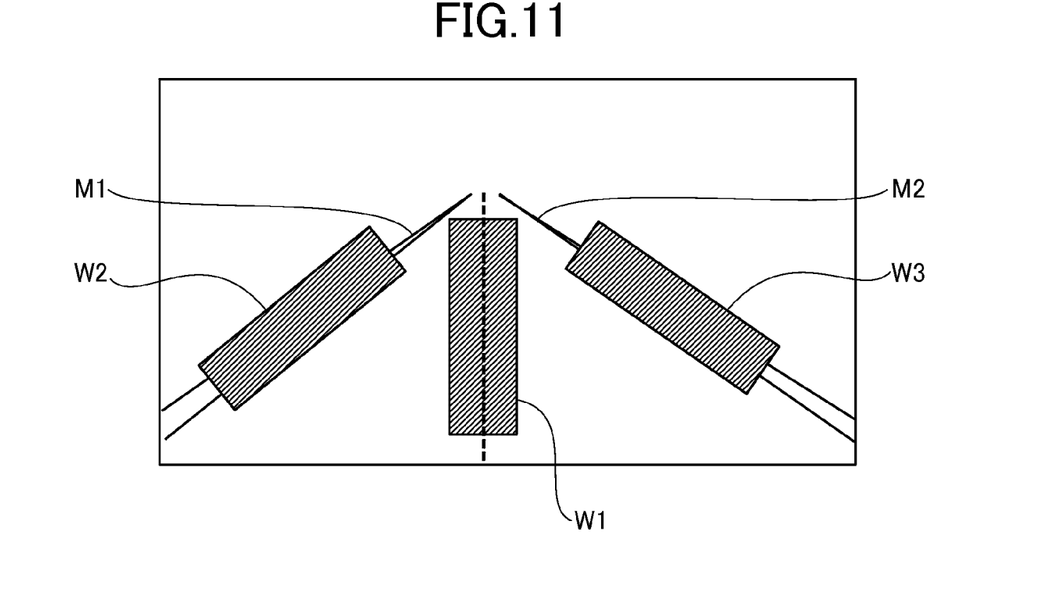
FIG. 11 is a view explaining a third method for setting windows.

That is, as shown in FIG. 11, a window W1, a window W2, and a window W3 may be set at the road surface area, at the area including the left lane marker M1, and at an area including a right lane marker M2, respectively.

Then, one window to be used for setting the target density value may be selected according to a detected condition of the detected lane marker in the lane marker recognition part 238.

Specifically, when it is detected that curvature of the lane marker is larger than a predetermined value, there is possibility that the windows W2 and W3 which are to be set at the areas including lane markers are set at positions deviated from the lane markers. Accordingly, the window W1 set at the road surface area may be used to set the target density value of the road surface area and perform the processings of FIG. 5.

On the other hand, when it is detected that the curvature of the lane marker is smaller than a predetermined value, it may be judged that the windows W2 and W3 are certainly positioned at the areas including the lane markers and the window W2 or W3 may be used to set the target density value of the area including the lane marker and perform the processings of FIG. 5.

As described above, by selecting and using the more reliable window according to a driving place or a driving condition, a precise exposure control can be performed.

When a plurality of windows are used to perform processing, when a position where a selected window is set changes, it is necessary to change the method for detecting a subject according to a type of the area where the selected window is set.

That is, as described above, when the window W1 is set at the road surface area, it is necessary to detect the lane marker with a density value as a threshold value, which is higher by a predetermined value than the set target density value. On the other hand, when the window W2 or W3 is set at the area including the lane marker, it is necessary to detect the lane marker with a density value as a threshold value, which is lower by a predetermined value than the set target density value.

Figure 12:
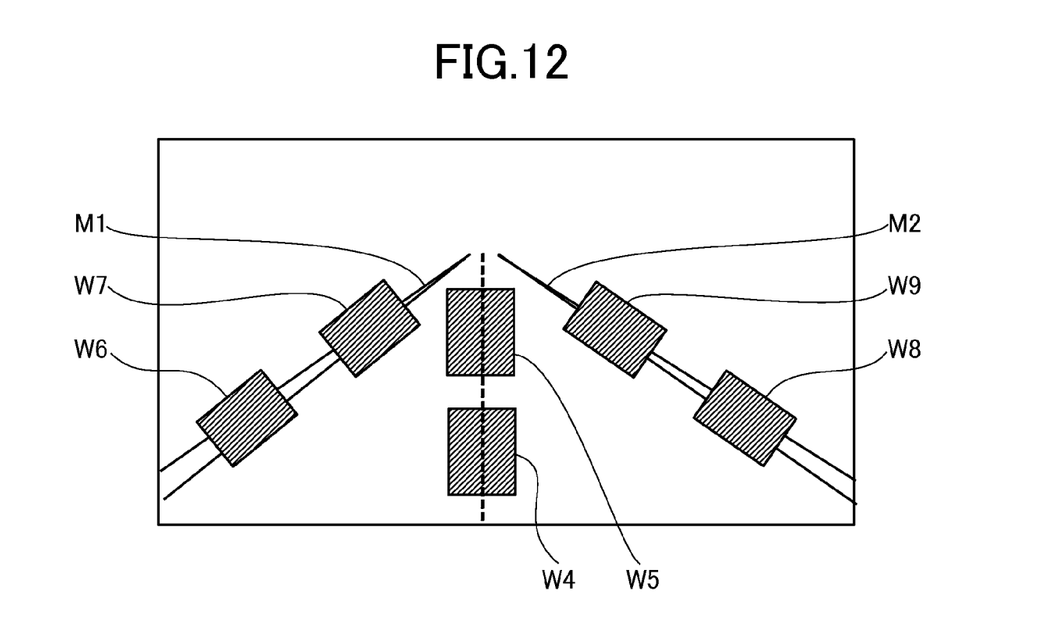
FIG. 12 is a view explaining a fourth method for setting windows.

As shown in FIG. 12, a plurality of windows may be set at an area immediately close to the vehicle and an area far from the vehicle so that an approach to an entrance and an exit of a tunnel can be detect.

That is, as shown in FIG. 12, windows W4, W5 are set at the road surface area, windows W6, W7 are set at the area including the left lane marker M1, and windows W8, W9 are set at the area including the right lane marker M2.

In the density value calculation part 233, shifts of density values in each window according to time are measured. When the density values in the far side windows W5, W7, W9 are higher than the target density value by a predetermined value or more, it can be judged that the vehicle is approaching an exit of a tunnel.

When the density values in the far side windows W5, W7, W9 are lower than the target density value by a predetermined value or more, it can be judged that the vehicle is approaching an entrance of a tunnel.

As described above, by detecting an approach to an entrance or an exit of a tunnel, setting of the target density values px, py can be performed.

At this time, by using the windows W4, W6, W8 which are set at the area close to the vehicle, processings for an exposure control shown in FIG. 5 are performed.

Although it is described that the exposure property shown in FIG. 4 is set at each of different shutter speeds, it is not limited thereto. The exposure properties may be changed by changing a gain of the image pickup device 110.

Especially, by changing both of the shutter speed and the gain, a variable range of the exposure properties can be further expanded. Thereby, an applicable range for peripheral brightness can be expanded.

In the above embodiment, in the exposure property setting part 235, as explained in FIG. 6, by selecting the second exposure property providing a density value p4 which is the closest to the target density value pt with respect to the average value of the brightness value and this value is set as the third exposure property. However, it is not limited thereto.

That is, a third exposure property with which a subject with the average value L1 of the brightness values is imaged with the target density value pt can be calculated to be set.

This calculation is performed by interpolating second exposure property stored in the second exposure property table 212 by a linear interpolation. The calculated exposure property is written in the exposure property table 150. Then, the shutter speed and the gain of the image pickup device 110 to achieve the third exposure property are calculated in the image pickup device controller 236, and the shutter speed and the gain are set in the imaging part 100 by instructions from the image pickup device controller 236 to perform imaging peripheral of the vehicle under the set condition.

The above described embodiment relates to the lane marker detection device as an example of the exposure controller for the on-vehicle camera according to the present invention. However, the scope of the present invention is not limited to a lane marker detection device.

That is, since the on-vehicle camera exposure controller according to an embodiment of the present invention is to perform imaging vehicle peripheral with an appropriate exposure, it can be applied for recognition of a leading vehicle, recognition of road signs, and the like.

According to an exposure controller for an on-vehicle camera according to an embodiment of the present invention, an exposure control of the imaging part can be performed such that predetermined subjects such as a road surface and a lane marker are imaged with a constant contrast regardless of variation of peripheral brightness and direction of the variation. Since the predetermined subjects such as the road surface and the lane marker can be imaged with a constant contrast, an appropriate threshold value for identify the road surface and the lane marker can be easily set.

What is claimed is:

1. An exposure controller for an on-vehicle camera mounted on a vehicle, comprising:
    an imaging part mounted on the vehicle and configured to image vehicle peripheral including a predetermined subject, the imaging part being capable of changing a shutter speed;
    an exposure property conversion part configured to convert a plurality of first exposure properties indicating a relationship between brightness values of the subject imaged by the imaging part and density values of pixels corresponding to the subject in an imaged image by the imaging part into a plurality of second exposure properties where each of the relationships has linearity;
    a density conversion part configured to convert the brightness values of the subject imaged by the imaging part into density values based on one of the plurality of second exposure properties;
    a target density value setting part configured to set a target density value with which pixels in at least one predetermined window set in the image having the density values obtained by the density conversion part are to be imaged;
    an exposure property setting part configured to set a third exposure property having the same exposure property as the second exposure property in a range where the second exposure property has linearity, the third exposure property being used to convert the brightness values corresponding to the density values of the pixels in the window into the target density value; and
    an image pickup device controller configured to change the shutter speed of the imaging part so as to achieve the third exposure property to perform an imaging.

2. The exposure controller according to claim 1, wherein the plurality of second exposure properties are obtained by converting the plurality of first exposure properties set for different shutter speeds of the imaging part, respectively; and
the plurality of second exposure properties have linearity in a relationship between the brightness values of the subject imaged by the imaging part and the density values of the pixels corresponding to the subject in the image imaged by the imaging part over a predetermined density value range.

3. The exposure controller according to claim 2, wherein the plurality of second exposure properties includes at least two different second exposure properties set with respect to a specific brightness value within the range where the plurality of second exposure properties have the linearity.

4. The exposure controller according to claim 1, wherein the target density value is set as a density value which is a central value in the density value range where the second exposure property has the linearity.

5. The exposure controller according to claim 1, wherein the target density value is set as a value according to the plurality of brightness values calculated from the images imaged at different times in the brightness value calculation part within the density value range where the second exposure property has the linearity.

6. The exposure controller according to claim 1, wherein the target density value is set as a value which monotonically increases according to the brightness value within the density value range where the second exposure property has linearity.

7. The exposure controller according to claim 1, wherein the exposure property setting part sets as the third exposure property an exposure property with which the pixels in the window are imaged with the target density value based on the plurality of second exposure properties.

8. The exposure controller according to claim 1, wherein the exposure property setting part selects as the third exposure property an exposure property with which the pixels in the window are imaged with the target density value from the plurality of second exposure properties.

9. The exposure controller according to claim 1, wherein the window is set in a road surface area in the image imaged by the imaging part.

10. The exposure controller according to claim 1, wherein the window is set in an area including a part of the predetermined subject in the image imaged by the imaging part.

11. The exposure controller according to claim 1, wherein the at least one window includes a plurality of windows set in the image imaged by the imaging part; and
one of the plurality of windows is selected to be used for calculating the target density value based on a place of the vehicle or a driving condition of the vehicle.

12. The exposure controller according to claim 1, wherein the predetermined subject is a white line or a yellow line drawn at a position indicating a border of a driving lane on the road surface.

\* \* \* \* \*